(12) United States Patent
Schleifer et al.

(10) Patent No.: US 10,684,199 B2
(45) Date of Patent: Jun. 16, 2020

(54) PREPARATION OF TISSUE SECTIONS USING FLUORESCENCE-BASED DETECTION

(71) Applicant: Agilent Technologies, Inc., Santa Clara, CA (US)

(72) Inventors: Kyle Schleifer, Somerville, MA (US); Kristin Briana Bernick, San Jose, CA (US); Adrienne Mccampbell, San Jose, CA (US); Nicholas M Sampas, San Jose, CA (US); Victor Lim, Pacifica, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 64 days.

(21) Appl. No.: 15/995,755

(22) Filed: Jun. 1, 2018

(65) Prior Publication Data

US 2019/0368982 A1 Dec. 5, 2019

Related U.S. Application Data

(60) Provisional application No. 62/537,848, filed on Jul. 27, 2017.

(51) Int. Cl.
*G01N 1/30* (2006.01)
*G01N 1/06* (2006.01)
*G01N 1/28* (2006.01)
*G01N 35/00* (2006.01)
*G06T 7/00* (2017.01)

(52) U.S. Cl.
CPC .............. *G01N 1/30* (2013.01); *G01N 1/06* (2013.01); *G01N 1/286* (2013.01); *G01N 35/00594* (2013.01); *G06T 7/0012* (2013.01); *G01N 2001/068* (2013.01); *G01N 2001/2873* (2013.01); *G06T 2207/10064* (2013.01); *G06T 2207/10152* (2013.01); *G06T 2207/30024* (2013.01)

(58) Field of Classification Search
CPC . G01N 1/06; G01N 1/30; G01N 1/286; G06T 7/0012; G06T 2207/30024
See application file for complete search history.

(56) References Cited

U.S. PATENT DOCUMENTS 10,269,094 B2 * 4/2019 Fuchs ................. G02B 21/367
2004/0026630 A1 2/2004 Mohun et al.
(Continued)

FOREIGN PATENT DOCUMENTS

EP 0209369 A2 1/1987

OTHER PUBLICATIONS

Extended European Search Report dated Oct. 8, 2018, Application No. 18184642.9, 9 pages.

*Primary Examiner* — David P Porta
*Assistant Examiner* — Fani Boosalis

(57) ABSTRACT

The present disclosure is directed to an improved method for distinguishing tissue from an embedding medium, such as paraffin in a formalin-fixed paraffin-embedded sample. The method involves the use of fluorescence of naturally-occurring species in tissue to determine the location of the tissue in the embedded sample. An embedded sample is generally excited by light of a selected wavelength, and the fluorescence emission at an emitted wavelength is used to locate the boundary or location of the tissue in the embedded sample.

20 Claims, 11 Drawing Sheets

- Tissue clearly visible by cut number 42
- No tissue remaining by cut number 91

(56) References Cited

U.S. PATENT DOCUMENTS

| | | |
|---|---|---|
| 2009/0220130 A1 | 9/2009 | Slingerland |
| 2010/0118133 A1 | 5/2010 | Walter et al. |
| 2012/0002043 A1 | 1/2012 | Nitta |
| 2015/0050650 A1* | 2/2015 | Seppo .................. C12Q 1/6841 435/6.11 |
| 2015/0141278 A1* | 5/2015 | Hollman-Hewgley ...................... G01N 1/30 506/9 |
| 2016/0290926 A1 | 10/2016 | Notingher et al. |
| 2017/0191937 A1 | 7/2017 | Levenson et al. |

* cited by examiner

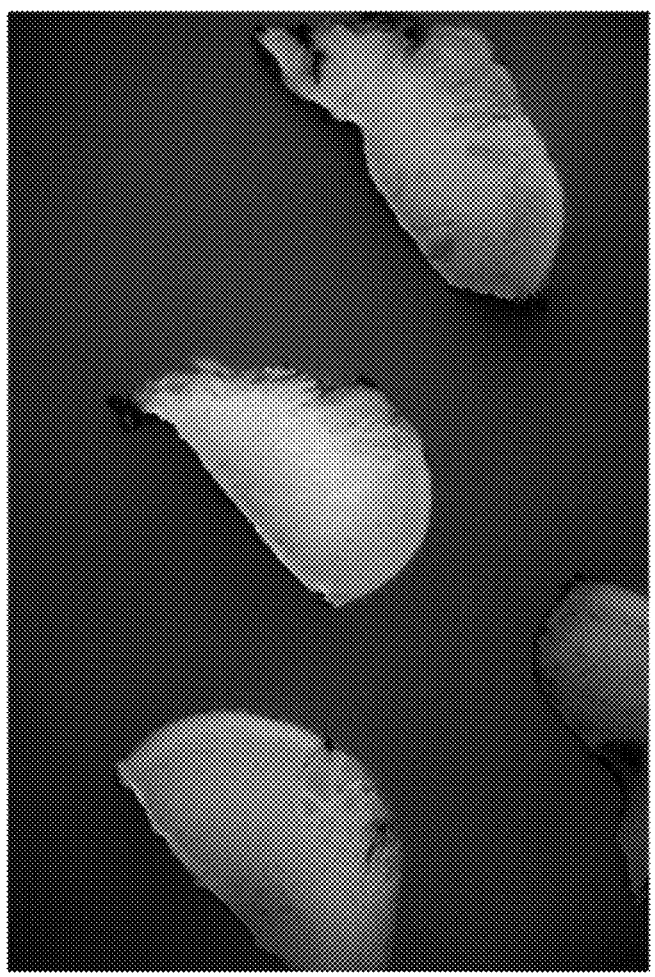

PREPARATION OF TISSUE SECTIONS USING FLUORESCENCE-BASED DETECTION

CROSS-REFERENCE TO RELATED APPLICATIONS

This application claims the benefit of U.S. Provisional Application No. 62/537,848, filed Jul. 27, 2017, the contents of which are incorporated by reference in their entirety.

FIELD OF THE INVENTION

The present disclosure relates to methods of preparing tissue sections from an embedded sample such as a formalin-fixed paraffin-embedded sample using fluorescence-based detection.

BACKGROUND

The formation of a formalin-fixed paraffin-embedded (FFPE) tissue block serves to preserve the morphology and cellular content of a tissue sample. Tissue processing generally involves placing an isolated tissue in formalin for a time period such as a few days, and then embedding the tissue in a paraffin wax. FFPE samples can be conveniently stored at room temperature for extended periods of time, and are especially useful for immunohistochemical staining and morphology analyses. FFPE samples may also be used for profiling gene expression and studying diseases.

At the time of biological testing, the FFPE tissue block is generally trimmed by cutting the tissue block on a microtome. The tissue block may be analyzed to determine the boundaries of the tissue in the FFPE by a technician or using an automated method. In the former case, a technician generally examines the FFPE block to observe the diffuse image of the tissue embedded in the paraffin. The technician may ascertain what the cross-sectional area of a section comprising the tissue should look like and compare that to the tissue sections as they emerge from the microtome blade. Preferably, the tissue block is trimmed to expose a representative amount of tissue to the surface of the block and to ensure that the block face is in line with the knife's edge.

During automated analysis, a camera is commonly utilized to image the tissue. A light source illuminates the surface of the tissue block at an angle to distinguish the difference between the paraffin and tissue surfaces. Since paraffin is comparably smoother than tissue, automated analysis utilizes the different natural textures of paraffin and tissue to differentiate between the two materials.

US 2010/0118133 A1 discloses an automated method and device for producing thin sections of tissue and obtaining an image of a surface generated by sectioning the sample using a camera. A device is used to evaluate the image to determine whether the section of the sample is acceptable for further use.

Many existing methods provide inaccurate and inconsistent data when used to analyze different tissue and paraffin types, since many methods are sensitive to variability of optical and surface characteristics of tissue and paraffin. In some cases, it is quite difficult to distinguish tissue from paraffin in an FFPE sample using existing methods.

Accordingly, there is a need for an additional method and apparatus for determining the location of a tissue sample in an embedding medium such as paraffin. The present methods and apparatus provide an accurate and consistent method for differentiating tissue from paraffin in a tissue block.

SUMMARY OF THE INVENTION

In an embodiment, the present disclosure provides a method of determining the location of a tissue in an embedded sample. The method comprises irradiating an embedded sample with light having a wavelength of from about 200 nm to about 600 nm, wherein the embedded sample comprises a tissue and an embedding medium; detecting fluorescence emission of the embedded sample; and determining the location of at least a portion of the tissue in the embedded sample based on the fluorescence emission.

In another embodiment, the present disclosure provides a method of determining the location of a tissue in an embedded sample. The method comprises irradiating an embedded sample comprising a tissue and an embedding medium with at least one light source to produce a first fluorescence emission and a second fluorescence emission; detecting the first fluorescence emission and the second fluorescence emission; and determining the location of at least a portion of the tissue in the embedded sample based on the first fluorescence emission and the second fluorescence emission.

In another embodiment, the disclosure provides an apparatus for slicing a tissue section from an embedded sample. The apparatus comprises a microtome comprising a sample holder adapted for linear motion, a knife holder and a knife held by the knife holder opposite the sample holder, such that when the sample holder is moved linearly, a sample held by the sample holder is sliced by the knife to form a tissue section; at least one light source directed at the sample holder; and an optical system positioned to capture emitted light from a sample held by the sample holder.

These and other features and advantages of the present methods and apparatus will be apparent from the following detailed description, in conjunction with the appended claims.

BRIEF DESCRIPTION OF THE DRAWINGS

The present teachings are best understood from the following detailed description when read with the accompanying drawing figures. The features are not necessarily drawn to scale.

FIG. 2 shows a photograph that displays an example of a tissue in a formalin-fixed paraffin-embedded block where the tissue is indistinguishable from paraffin in the block sample.

FIGS. 3A and 3B show an image of the interface between a tissue and paraffin in a formalin-fixed paraffin-embedded tissue block using bright field analysis (FIG. 3A) and dark field analysis (FIG. 3B).

FIG. 8A is a collection of fluorescence emission images of various slices of a formalin-fixed paraffin-embedded tissue block sample comprising a single tissue. The images were obtained using a 365 nm excitation source with a 560 nm 55 nm bandpass emission filter.

DEFINED TERMINOLOGY

Figures 1A, 1B:
FIGS. 1A and 1B show photographs of a tissue sample that is fully embedded in paraffin (FIG. 1A) and a tissue sample that is embedded in paraffin and trimmed to expose a section of the tissue (FIG. 1B).

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

The term "autofluorescence" refers to the natural emission of light by a biological molecule such as a protein.

The term "fluorophore" refers to a fluorescent compound that can re-emit light upon excitation with light. The term "endogenous fluorophore" refers to a naturally-occurring biological substance capable of autofluorescence.

A "fixed" tissue is one that has been contacted with a fixing agent for a suitable period of time.

An "embedded tissue" or "embedded sample" is a tissue sample that is partially or completely surrounded by an embedding medium such as a paraffin or an epoxy resin. The embedded tissue or embedded sample of the present disclosure should not be confused with a tissue section that results from slicing or trimming of an embedded tissue.

The term "formalin-fixed paraffin-embedded block" or "formalin-fixed paraffin-embedded sample" or "FFPE sample" refers to a formalin-treated tissue embedded in paraffin.

The terms "pixel intensity" or "pixel intensity values" are used interchangeably and refer to the detected fluorescent signal averaged over a region of interest in a digital image. During acquisition of a digital image, the photons that are detected at each pixel are converted to an intensity value that is proportional to the number of detected photons. The pixel intensity can be used to determine the local concentration of fluorophores in a specimen.

As used in the specification and appended claims, and in addition to their ordinary meanings, the terms "substantial" or "substantially" mean to within acceptable limits or degree to one having ordinary skill in the art. For example, "substantially cancelled" means that one skilled in the art considers the cancellation to be acceptable.

As used in the specification and the appended claims and in addition to its ordinary meaning, the terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same.

In the present disclosure, numeric ranges are inclusive of the numbers defining the range. In the present disclosure, wherever the word "comprising" is found, it is contemplated that the words "consisting essentially of" or "consisting of" may be used in its place.

Unless defined otherwise, all technical and scientific terms used herein have the same meaning as commonly understood by those working in the fields to which this disclosure pertain.

DETAILED DESCRIPTION

Methods are provided which allow for one to distinguish a tissue from an embedding medium in an embedded sample. FIG. 1 shows a tissue fully embedded in paraffin (1A) and a corresponding trimmed sample (1B). In order to determine the location of a tissue for trimming, tissue in an embedding medium is often visually assessed to identify the interface between the tissue and the embedding medium. In many cases, it is difficult to visually identify the interface between the tissue and embedding medium. Such an example is shown in FIG. 2, where the tissue in an FFPE sample is indistinguishable from the paraffin embedding medium. FIGS. 3A and 3B show an image of the interface between a tissue and paraffin in a formalin-fixed paraffin-embedded tissue block obtained using bright field analysis (FIG. 3A) and dark field analysis (FIG. 3B). In some cases, it may be difficult to identify the interface between a tissue and an embedding medium using such methods. The present method and apparatus solves this problem, using fluorescence to locate tissue in an embedded sample.

Contrary to existing methods, the present methods utilize autofluorescence of endogenous fluorophores in tissue to distinguish tissue from an embedding medium such as paraffin or an epoxy resin. Contrasting between tissue and an embedding medium can be achieved by irradiating an embedded sample such as a formalin-fixed paraffin-embedded (FFPE) tissue block at an appropriate wavelength, and detecting the resulting fluorescence emission. The fluorescence emission can be used to determine the location of at least a portion of the tissue. For example, the present methods can be used to locate the surface of tissue in a formalin-fixed paraffin-embedded (FFPE) tissue block. After the tissue is located in the embedded sample, the tissue may be further processed by trimming or slicing to obtain one or more tissue sections. The fluorescence methods of the present disclosure are performed prior to biological analysis or staining of a tissue section. The present methods are effective for a wide-variety of tissue types, and can be used to distinguish tissue from paraffin in cases where the tissue is optically indistinguishable from the embedding medium under normal lighting conditions.

Figures 4A, 4B:
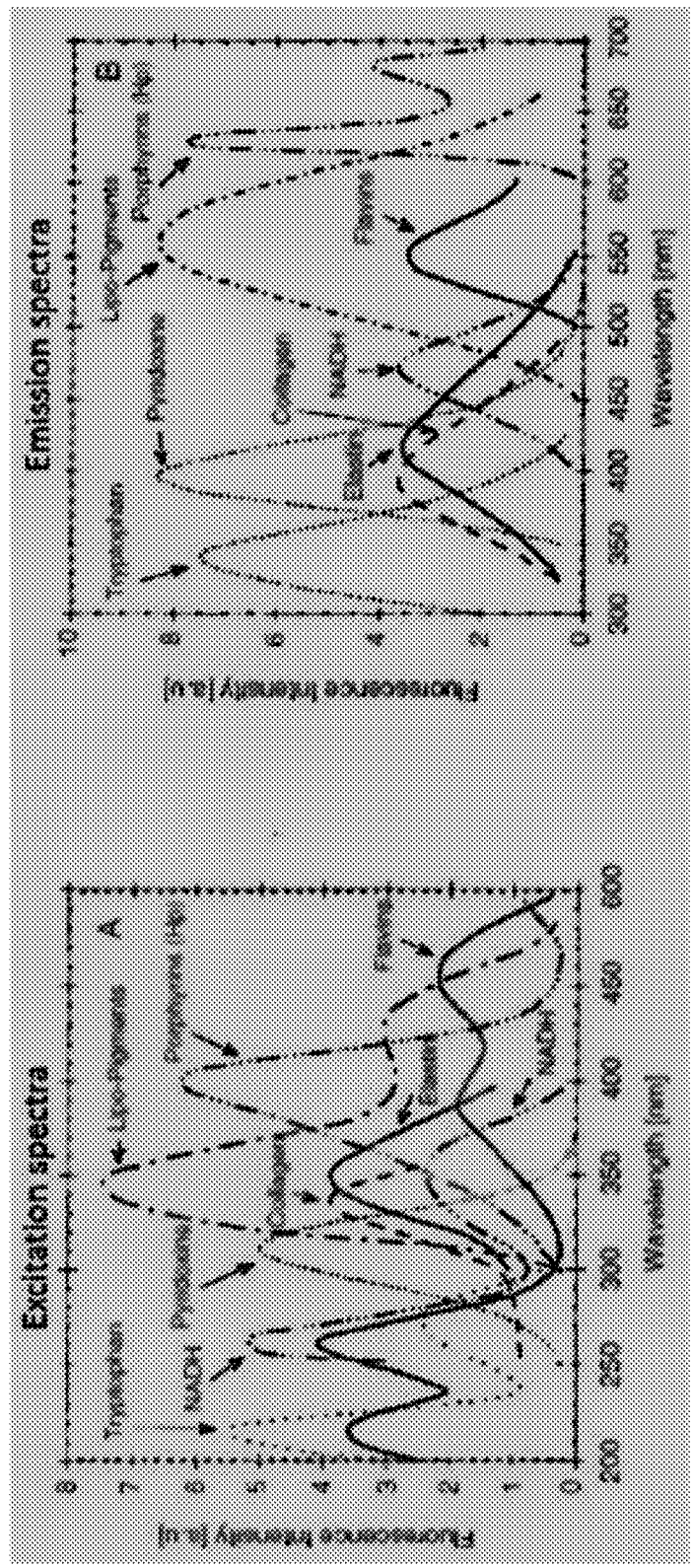
FIGS. 4A and 4B show graphs of the excitation spectra (FIG. 4A) and the emission spectra (FIG. 4B) of various fluorophores endogenous to human tissue. Each graph shows the wavelength of light versus fluorescence intensity.

Fluorescence, which is the emission of light by a substance that has absorbed electromagnetic radiation, is commonly used to elucidate the presence or amount of an analyte. Fluorescent compounds are capable of absorbing and emitting light under certain conditions, where the emitted light is generally of lower energy. Autofluorescence is natural emission of light by biological molecules, generally at a wavelength peak or pattern, when the molecules are irradiated at certain wavelengths. Each fluorescent biological molecule has its own excitation and emission spectrum. In human and animal tissue, proteins such as collagen and elastin are capable of autofluorescence. FIG. 4A shows the excitation spectra of a number of biological molecules, and FIG. 4B shows the emission spectra of the same biological molecules. Proteins can serve as endogenous fluorophores and can be detected or tracked by monitoring the protein's fluorescence emission.

In an embodiment, the present disclosure provides a method of determining the location of a tissue in an embedded sample. The method comprises irradiating an embedded sample with light having a wavelength of, for example, from about 200 nm to about 600 nm, wherein the embedded sample comprises a tissue and an embedding medium; detecting fluorescence emission of the embedded sample; and determining the location of at least a portion of the tissue in the embedded sample based on the fluorescence emission.

In some embodiments, the embedding medium is paraffin. In some embodiments, the embedding medium is an epoxy resin.

In some embodiments, the fluorescence emission is detected using an imaging device. In some embodiments, the imaging device comprises a camera such as a digital camera. In such cases, an embedded sample comprising tissue and an embedding medium such as paraffin is irradiated with light and the resulting fluorescence emission is captured using a digital camera. The presence of fluorescence in the digital image provides an indication that tissue is present in the sample under study. In some embodiments, the present method is performed using an optical system comprising a digital camera and a microtome. In some embodiments, the present method is performed using a fluorescence microscope.

In some embodiments, the embedding medium exhibits no substantial fluorescence when irradiated at a chosen wavelength.

The present methods may be used to analyze a tissue of any type. In some embodiments, the tissue is a human tissue. In some embodiments, the tissue is an animal tissue. In some embodiments, the tissue is a mouse, rat, dog, or primate tissue. The present method may be used to analyze a tissue section from any organ or anatomical part. In some embodiments, the tissue is isolated from the breast, prostate, lung, colon, rectum, urinary bladder, uterine corpus, thyroid, kidney, oral cavity (e.g., tonsil), pancreas, liver, cervix, stomach, small intestine, brain, spinal cord, heart, bone, joints, esophogus, gallbladder, adipose, skin, spleen, placenta, penis, urethra, fallopian tube, ovary, vulva, adrenal glands, appendix, or eye. In some embodiments, the tissue is pelleted cells from a human or an animal source. In some embodiments, the present method is used to test a diseased or healthy tissue. In some embodiments, the present method is used to identify cancer, infectious disease, metabolic disease, degenerative disease, inflammatory disease, or a combination thereof.

In some embodiments, the embedded sample is a formalin-fixed paraffin-embedded sample. The formalin-fixed paraffin-embedded sample may be formed from any type of paraffin. In some embodiments, the paraffin is a blend of fully refined paraffin wax and a synthetic resin or polymer. In some embodiments, the paraffin comprises dimethylsulfoxide (DMSO). In some embodiments, the formalin-fixed paraffin-embedded sample is formed from granulated paraffin wax, fully refined paraffin wax, semi-refined paraffin wax, or a combination thereof. Thus, in some embodiments, a tissue may be distinguished from granulated paraffin wax, fully refined paraffin wax, or semi-refined paraffin wax in a formalin-fixed paraffin-embedded sample. In some embodiments, the formalin-fixed paraffin-embedded sample is formed from Spectrum paraffin, Millipore paraffin, Fisherfinest Histopath paraffin wax, EMS Paramat, Paraplast, Polyfin, Sakura Finetek Tissue Tek VIP, Leica Surgipath Paraplast, or a combination thereof.

In some embodiments, the embedding medium is an epoxy resin. In some embodiments, the epoxy resin is a glycidyl epoxy resin. In some embodiments, the epoxy resin is a non-glycidyl epoxy resin. In some embodiments, the epoxy resin is a non-glycidyl resin selected from an aliphatic and cyclo-aliphatic resin. In some embodiments, the epoxy resin is a glycidyl epoxy selected from glycidyl amine, glycidyl ester, glycidyl ether, and a combination thereof. In some embodiments, the epoxy resin is ethylene glycol diglycidyl ether. In some embodiments, the epoxy resin is Araldite, Quetol, Epon 812, Embed 812, Poly-Bed 812, or a combination thereof. In some embodiments, the epoxy resin is a glycerol-based aliphatic epoxy resin. In some embodiments, embedding a tissue in an epoxy resin provides tissue sections having improved morphology.

In some embodiments, the embedded sample is cut or sliced to provide a slice and a trimmed block. In some embodiments, the embedded sample is sliced or trimmed on a microtome. In some embodiments, the autofluorescence of an embedded sample is detected while the embedded sample is being sliced or trimmed by a microtome. The trimmed block is irradiated with light, and analyzed to determine the presence of fluorescence. Imaging may be used to determine the presence of fluorescence. The trimming and/or irradiation process is repeated as needed. For example, the trimming/irradiation process may be repeated until the surface of the tissue is found.

In some embodiments, autofluorescence of one or more endogenous species is measured quantitatively to determine the location of tissue in an embedded sample.

In some embodiments, pixel intensity of a fluorescence digital image is used to determine the location of a tissue in an embedded sample. A trimmed block is irradiated with light, and a digital image is acquired using a fluorescence microscope. The fluorescence microscope system comprises software that converts photons detected during fluorescence analysis to pixel intensity values, allowing the user to determine the pixel intensity for a region of interest. The trimmed block may be further sliced or trimmed and analyzed by the fluorescence microscope system to provide a second digital image. A comparison of the pixel intensity of two or more digital images can be used to determine the location of the tissue in the embedded sample. For example, an increase in pixel intensity values between two digital images can indicate that the tissue in the trimmed block is exposed and is ready to be cut and used for biological testing.

In some embodiments, the present method is used to determine the location of a surface of a tissue sample in an embedded sample. In some embodiments, the present method is used to determine the location of a tissue-to-embedding medium transition or embedding medium-to-tissue transition in an embedded sample. In some embodiments, the present method is used to locate a tissue in its entirety.

In some embodiments, the method comprises slicing a section from the embedded sample and accepting or rejecting the section based on the determined location of the tissue surface. In some embodiments, the irradiating is performed multiple times and the embedded sample is cut prior to each irradiation.

The fluorescence emission of an endogenous species in tissue may be used to determine the location of a tissue in an embedded sample. Any endogenous fluorophore in tissue may be used. In some embodiments, the endogenous fluorophore is collagen, elastin, tryptophan, a porphyrin, a flavin, NADH, pyridoxin, a lipo-pigment, or a combination thereof. In some embodiments, the fluorescence emission of collagen is used to determine the location of a tissue in an embedded sample. In some embodiments, the fluorescence emission of elastin is used to determine the location of a tissue in an embedded sample. In some embodiments, the fluorescence emission of tryptophan is used to determine the location of a tissue in an embedded sample. In some embodiments, one or more of collagen, elastin, and tryptophan are used to determine the location of a tissue in an embedded sample.

In some embodiments, an excitation light having a wavelength of from about 320 nm to about 380 nm is used to detect collagen autofluorescence. In some embodiments, collagen maximum fluorescence emission is detected at a wavelength of from about 375 nm to about 425 nm.

In some embodiments, an excitation light having a wavelength of from about 320 nm to about 380 nm is used to detect elastin autofluorescence. In some embodiments, elastin maximum fluorescence emission is detected at a wavelength of from about 400 nm to about 450 nm.

In some embodiments, an excitation light having a wavelength of from about 180 nm to about 230 nm is used to detect tryptophan autofluorescence. In some embodiments, tryptophan maximum fluorescence emission is detected at a wavelength of from about 300 nm to about 350 nm.

The embedded sample may be irradiated with light having any suitable wavelength. In some embodiments, an embedded sample is irradiated with light having a wavelength of from about 200 nm to about 600 nm. Thus, in some embodiments, an embedded sample is irradiated with light having a wavelength of from about 200 nm to about 600 nm, from about 200 nm to about 550 nm, from about 200 nm to about 500 nm, from about 200 nm to about 450 nm, from about 200 nm to about 400 nm, from about 200 nm to about 350 nm, from about 250 nm to about 600 nm, from about 250 nm to about 550 nm, from about 250 nm to about 500 nm, from about 250 nm to about 450 nm, from about 250 nm to about 400 nm, from about 300 nm to about 500 nm, from about 300 nm to about 550 nm, from about 300 nm to about 600 nm, from about 350 nm to about 600 nm, from about 400 nm to about 600 nm, from about 450 nm to about 600 nm, from about 350 nm to about 550 nm, from about 350 nm to about 500 nm, from about 400 nm to about 600 nm, from about 400 nm to about 550 nm, or from about 450 nm to about 600 nm.

The fluorescence emission of the embedded sample can be detected at any suitable wavelength, usually the maximum emission wavelengths. In some embodiments, the embedded sample has a maximum fluorescence emission at a wavelength of from about 300 nm to about 600 nm. Thus, in some embodiments, the embedded sample has a maximum fluorescence emission at a wavelength of from about 300 nm to about 600 nm, from about 300 nm to about 550 nm, from about 300 nm to about 500 nm, from about 300 nm to about 450 nm, from about 300 nm to about 400 nm, from about 350 nm to about 600 nm, from about 350 nm to about 550 nm, from about 350 nm to about 500 nm, from about 350 nm to about 450 nm, from about 400 nm to about 600 nm, from about 450 nm to about 550 nm, or from about 500 nm to about 600 nm.

Fluorescence methods are generally performed using a light source and a detector configured to detect fluorescence as known in the art. In some embodiments, fluorescence techniques are carried out using a light source capable of shining light at a particular wavelength or range thereof. In some embodiments, an embedded sample is irradiated using one or more light sources. In some embodiments, the light source is a light-emitting diode (LED) light source. In some embodiments, the light source is a mercury arc lamp. In some embodiments, the light source is a xenon arc lamp. In some embodiments, the light source is a LASER. In some embodiments, the present method is performed using a fluorescence system having one or more excitation filters. In some embodiments, the fluorescence system comprises an aperture and one or more emission filters. In some embodiments, the fluorescence system comprises an imaging lens and an imaging camera.

An embedded sample may be formed using any suitable method. In some embodiments, a tissue is obtained from a subject and sectioned. The tissue is contacted with a formalin solution and fixed for at least 48 hours at room temperature. The tissue is commonly dehydrated using a series of ethanol baths and then embedded into a wax block. The wax generally comprises a mixture of straight chain alkanes having a chain length of from about 20 to about 40 carbons. In some embodiments, glutaraldehyde is used as a fixative to embed a tissue in an epoxy resin. The embedded sample may be sliced or sectioned for any subsequent analysis (e.g., microscopic slide analysis).

In some embodiments, the embedded sample may be further trimmed or sectioned to form a tissue section or slice. The embedded sample may be trimmed or sectioned using any suitable method (e.g., using a microtome blade). In some embodiments, a clearing agent such as a xylene can be used to remove the embedding medium from the section. In some embodiments, the tissue section is stained using at least one stain such as a Haematoxylin and/or Eosin, Acid/Basic Fuchsin, or Gram stain. In some embodiments, the tissue section may be mounted onto a slide for analysis. The stained tissue section may undergo further analysis using any suitable method (e.g., pathological analysis using a microscope).

In some embodiments, the present methods are performed to locate an embedded tissue for use in a fluorescence in situ hybridization (FISH) testing method. In some embodiments, the present methods are performed to locate an embedded tissue for use in a chromogenic in situ hybridization (CISH) testing method.

In another embodiment, the present disclosure provides a method of determining the location of a tissue in an embedded sample by irradiating an embedded sample comprising a tissue and an embedding medium with at least one light source to produce a first fluorescence emission and a second fluorescence emission; detecting the first fluorescence emission and the second fluorescence emission; and determining the location of at least a portion of the tissue in the embedded sample based on the first fluorescence emission and the second fluorescence emission.

In some embodiments, an embedded sample is irradiated with light having a wavelength of from about 250 nm to about 325 nm. In some embodiments, an embedded sample is irradiated with light having a wavelength of from about 300 nm to about 400 nm. In some embodiments, an embedded sample is irradiated concurrently at both wavelengths. In some embodiments, bright field microscopy is used in combination with the present method to determine the location of the tissue in the embedded sample.

In some embodiments, a first fluorescence emission is generated by fluorescence of an embedding medium in the embedded sample (e.g., paraffin). In some embodiments, a second fluorescence emission is generated by autofluorescence of a tissue component present in the embedded sample. In some embodiments, the first fluorescence emission has maximum fluorescence at a wavelength of from about 375 nm to about 425 nm and the second fluorescence emission has maximum fluorescence at a wavelength of from about 500 nm to about 600 nm.

In some embodiments, the embedded sample is irradiated using two or more light sources (e.g., two, three, four, five, or six). In some embodiments, the two or more light sources are the same. In some embodiments, the two or more light sources are different. In some embodiments, the sample is irradiated simultaneously or separately by the two or more light sources.

In some embodiments, the method is performed in the absence of a dichroic filter.

In some embodiments, the method comprises front illuminating an embedded sample transversely, such as at an oblique angle of from about 10 degrees to about 20 degrees from a plane of a face of the embedded sample. In some embodiments, a fluorescence emission is collected by a lens having a high numerical aperture. In some embodiments, illumination from two or more traverse directions (e.g., left or right or top or bottom) produces a uniform excitation and emission pattern.

In some embodiments, a high numerical aperture objective lens is used for excitation and collection of emitted light, as well as a filter cube with a dichroic beam splitter with excitation and emission filters. In some embodiments, an additional lens is used after the dichroic filter to focus the emitted light onto an imaging sensor.

In some embodiments, the embedding medium is weakly fluorescent. Thus, in some embodiments, a fluorescent dye can be added to the embedding medium. The fluorescent dye emits light at a different wavelength than the emission wavelength of an endogenous fluorophore in the tissue sample, thus a fluorescence emission from the fluorescent dye can be used to determine the location of tissue in an embedded sample. The fluorescent dye may be incorporated into the embedding medium prior to formation of the embedded sample.

In another embodiment, the disclosure provides an apparatus for slicing a tissue section from an embedded sample. The apparatus comprises a microtome comprising a sample holder adapted for linear motion, a knife holder and a knife held by the knife holder opposite the sample holder, such that when the sample holder is moved linearly, a sample held by the sample holder is sliced by the knife to form a tissue section; at least one light source directed at the sample holder; and an optical system positioned to capture emitted light from a sample held by the sample holder.

In some embodiments, the apparatus comprises at least two light sources. In some embodiments, the apparatus comprises at least three light sources. In some embodiments, the apparatus comprises at least four light sources.

In some embodiments, the apparatus comprises a filter cube with a dichroic beam splitter with excitation and emission filters. In some embodiments, the apparatus comprises a dichroic filter. In some embodiments, the apparatus comprises an additional lens after the dichroic filter to focus the emitted light onto an imaging sensor. In some embodiments, the apparatus comprises an emission filter in a filter cube assembly, where switching of at least one excitation source switches at least one filter.

In some embodiments, the apparatus includes one or more excitation filters. In some embodiments, the apparatus comprises an aperture. In some embodiments, the apparatus comprises a lens having a high numerical aperture. In some embodiments, the apparatus comprises one or more emission filters. In some embodiments, the apparatus comprises an imaging lens. In some embodiments, the optical system comprises a camera. In some embodiments, the optical system comprises a digital camera. In some embodiments, the optical system is capable of detecting at least one fluorescence emission.

In some embodiments, the apparatus comprises a microtome blade, at least one light source, at least one excitation filter, at least one aperture, at least one emission filter, a lens assembly, and at least one camera.

In some embodiments, the apparatus comprises a microtome blade, at least two light sources, at least two excitation filters, at least one aperture, at least two emission filters, a lens assembly, at least one camera, and at least one mechanism for switching between emission filters.

In some embodiments, the apparatus comprises a microtome blade, at least two light sources, at least two excitation filters, at least one aperture, a dual-band bandpass emission filter, a lens assembly, and at least one multi-color camera. In some embodiments, the multicolor camera has microfilters in front of each pixel.

In some embodiments, the apparatus comprises a microtome blade, at least one light source, at least one excitation filter, at least one aperture, an objective lens assembly, a tube lens or relay lens, a dichroic beamsplitter, at least one emission filter in filter cube assembly, at least one camera. In some embodiments, switching between excitation sources is accompanied by switching filters.

Figure 7A:
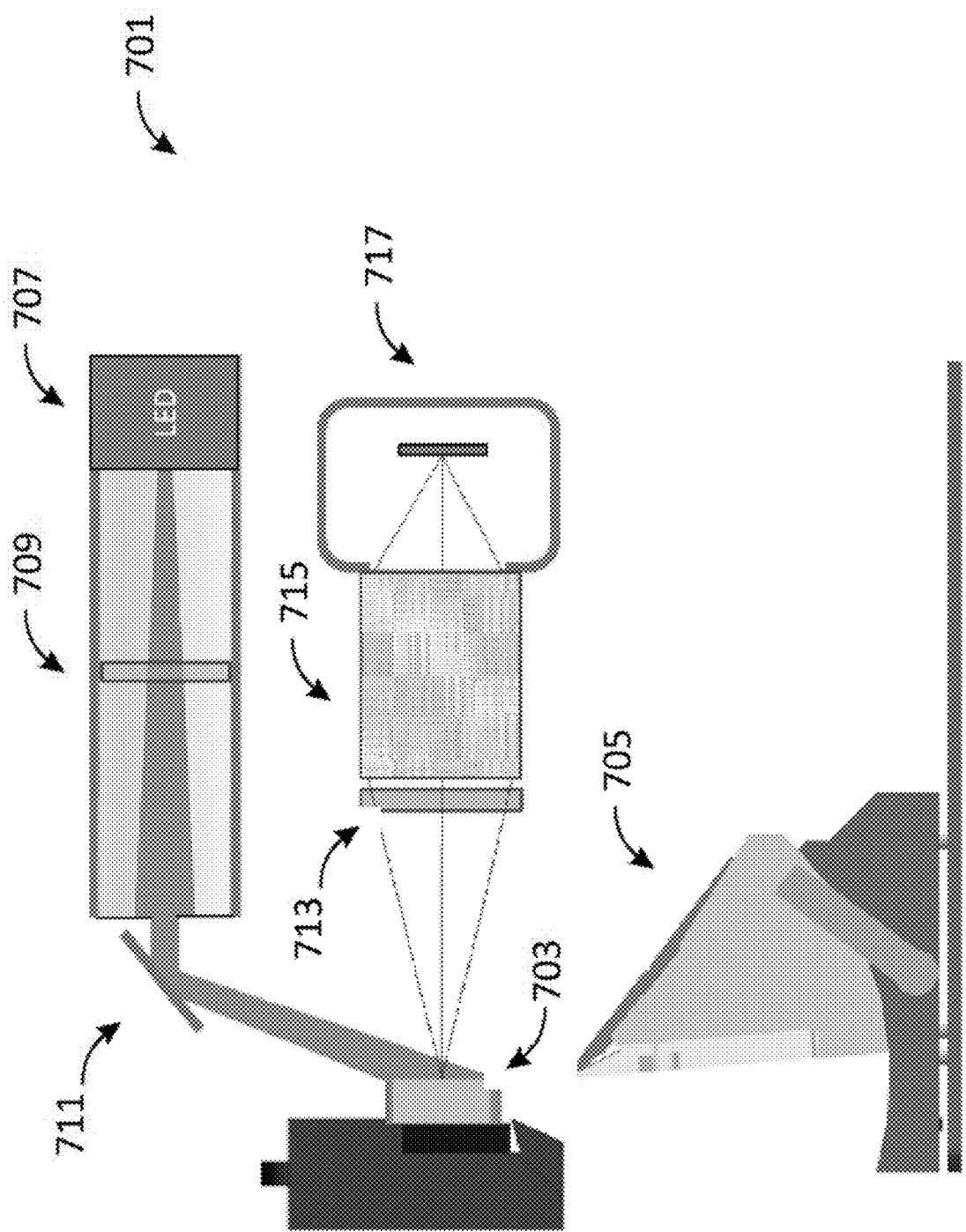
FIGS. 7A-7D show hardware diagrams for fluorescence-based imaging systems in accordance with embodiments of the present disclosure.
Figure 7B:
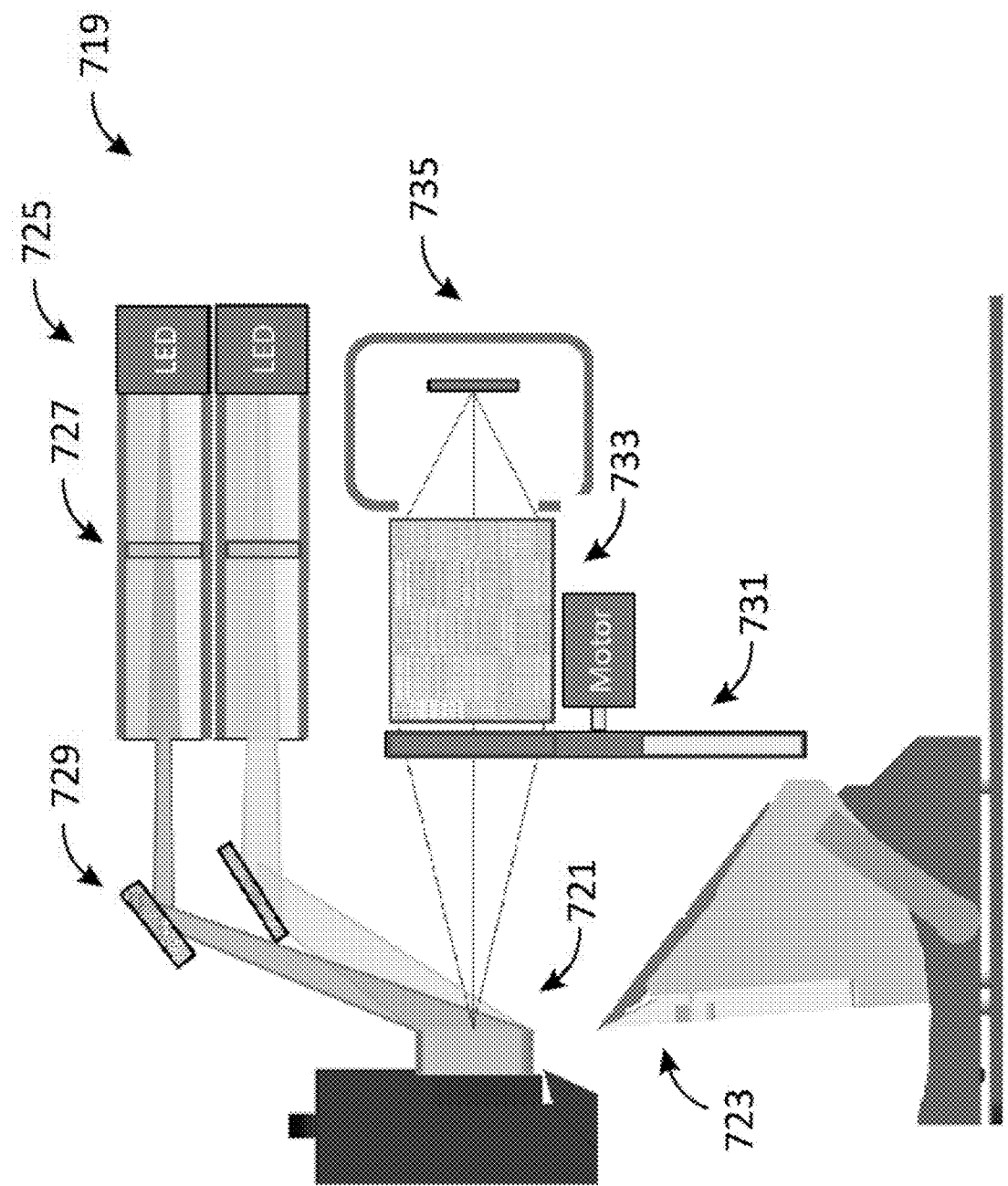
Figure 7C:
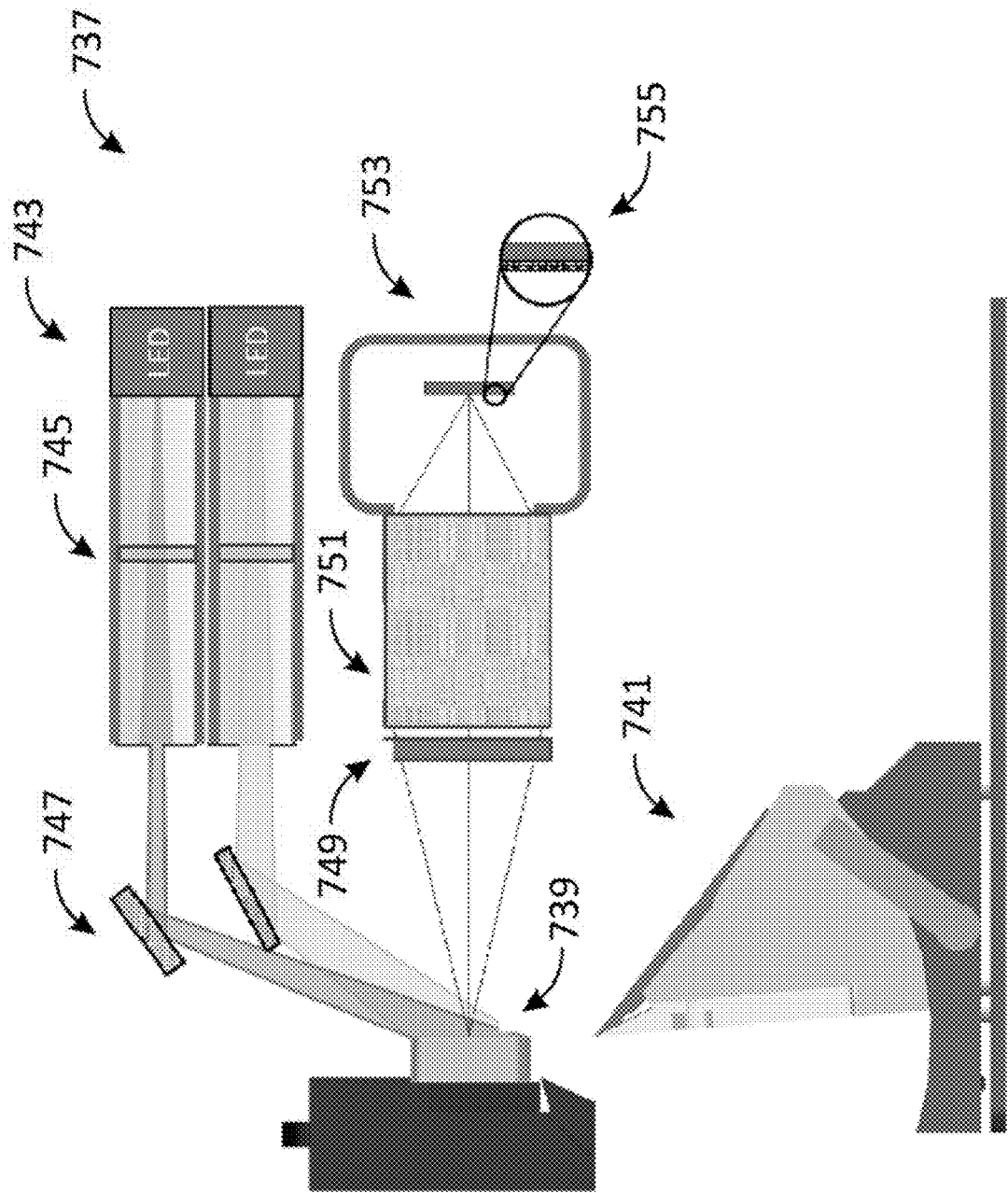
Figure 7D:
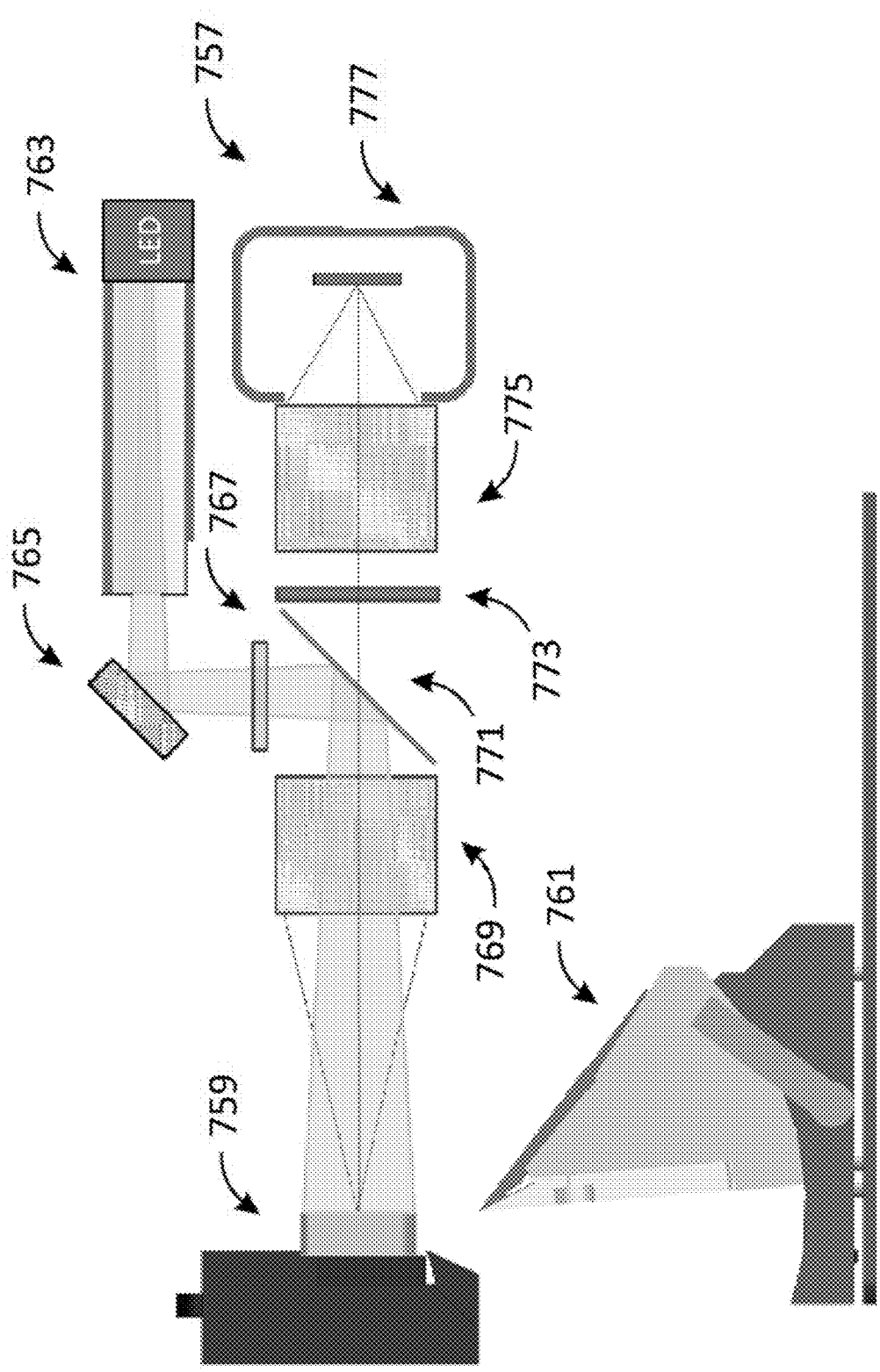

FIGS. 7A-7D show non-limiting examples of fluorescence-based imaging systems. Each system includes a microtome blade, one or more light sources, one or more excitation filters, a 2-dimensional aperture, one or more emission filters, an imaging lens, and an imaging camera. FIG. 7A shows a single-color fluorescence imaging system 701 that can be used to image an embedded sample 703 which comprises a microtome blade 705, an LED light source 707, an excitation filter 709, an aperture 711, an emission filter 713 with a mechanism for switching emission filters, a lens assembly 715, and a camera 717 in accordance with an embodiment of the disclosure. FIG. 7B shows a two-color fluorescence imaging system 719 that can be used to image an embedded sample 721 which comprises a microtome blade 723, LED light sources 725, excitation filters 727, apertures 729, an emission filter with a motorized wheel assembly 731, a lens assembly 733, and a camera 735 in accordance with an embodiment of the disclosure. FIG. 7C shows a two-color fluorescence imaging system 737 that can be used to image an embedded sample 739 which comprises a microtome blade 741, LED light sources 743, excitation filters 745, apertures 747, a two-color band-pass emission filter 749, a lens assembly 751, a color camera 753 having a multi-color image sensor 755 in accordance with an embodiment of the disclosure. FIG. 7D shows a fluorescence imaging system 757 which can be used to image an embedded sample 759 which comprises a microtome blade 761, an LED light source 763, an aperture 765, an excitation filter 767, an objective lens assembly 769, a dichroic beam splitter 771, an emission filter 773, a tube lens or relay lens 775, and a camera 777 where switching of the excitation source is accompanied by switching the filters in accordance with an embodiment of the disclosure.

In some embodiments, the optical system comprises a processor in communication with the optical system and configured to provide a signal based on a fluorescence emission from the sample.

It is to be understood that the teachings of this disclosure are not limited to the particular embodiments described, and as such can, of course, vary. It is also to be understood that the terminology used herein is for the purpose of describing particular embodiments only, and is not intended to be limiting, since the scope of the present teachings will be limited only by the appended claims.

As disclosed herein, a number of ranges of values are provided. It is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

All patents and publications referred to herein are expressly incorporated by reference. The citation of any publication is for its disclosure prior to the filing date and should not be construed as an admission that the present claims are not entitled to antedate such publication. Further, the dates of publication provided can be different from the actual publication dates which can be independently confirmed.

As used in the specification and appended claims, the terms "a," "an," and "the" include both singular and plural referents, unless the context clearly dictates otherwise.

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

Example 1

This Example illustrates a method of measuring fluorescence of endogenous fluorophores in human tissue in accordance with an embodiment of the present disclosure.

An FFPE human tissue block was obtained. The FFPE block was analyzed to determine if autofluorescence can be used to differentiate tissue in the FFPE block from paraffin. The uncut FFPE block was subjected to light corresponding to the excitation wavelengths of elastin and collagen. Any resulting fluorescence emission was detected using digital imaging. The FFPE block was cut using a ThermoFisher microtome blade, where consecutive cuts of the FFPE block were performed in intervals ranging from 5 to 40 microns in thickness. After each cut, the block face of the FFPE block was subjected to light corresponding to the excitation wavelengths of elastin and collagen and the fluorescence emission was detected using digital imaging. The images were collected at a 4× magnification. The pixel intensity for each image was recorded and plotted.

For the experiment, an X-Cite 120 Q was used as the light source. The fluorescence of elastin was detected using a Zeiss Filter Set 38 for fluorescein or green fluorescent protein (GFP) having an excitation/emission spectra of 470/525 nm (bandpass of 40 nm). The fluorescence of collagen was detected using a Zeiss Filter Set 49 for DAPI having an excitation/emission spectra of 365/445 nm (bandpass of 50 nm). The exposure times for GFP and DAPI was 65 msec and 175 msec, respectively. A Zeiss Axio Imager M2 was used to visualize the presence of autofluorescence in the FFPE sample. Images of autofluorescence were obtained using an AxioCAM MRM.

Figure 5:
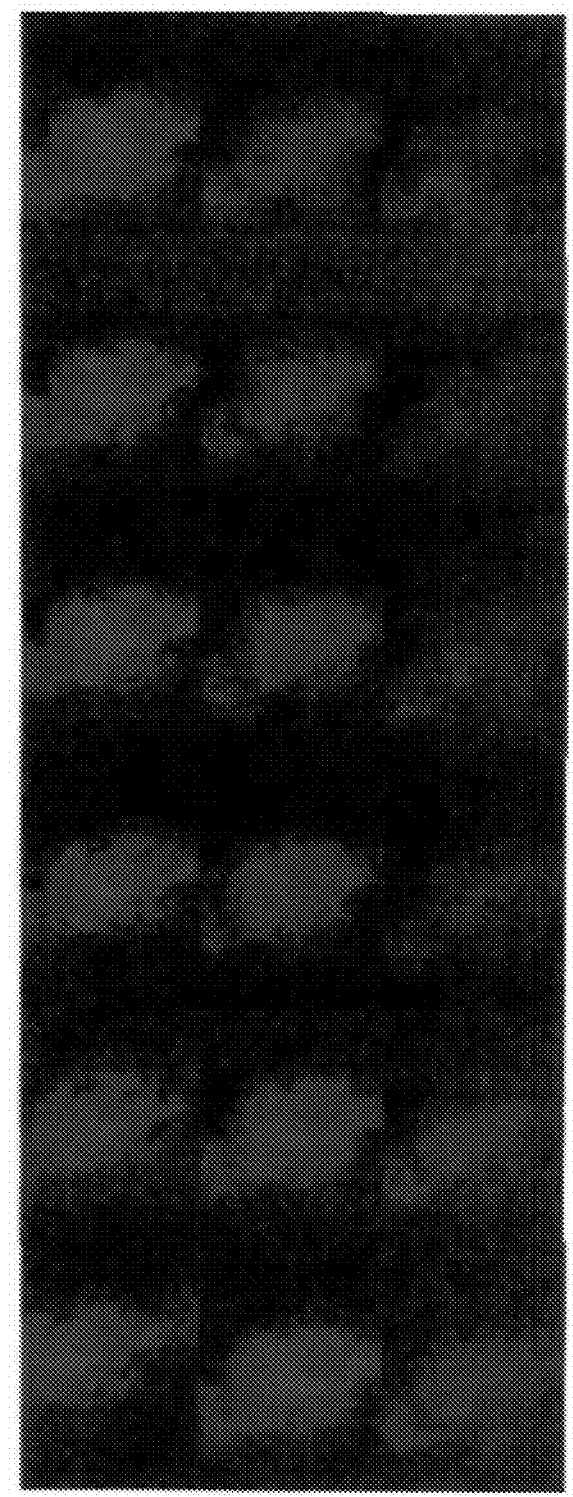
FIG. 5 shows a collection of fluorescent images of the fluorescence emission of block faces of a formalin-fixed paraffin-embedded block at 4× magnification. The images were obtained by imaging fluorescence of the formalin-fixed paraffin-embedded tissue block sample in between slices.
Figure 6:
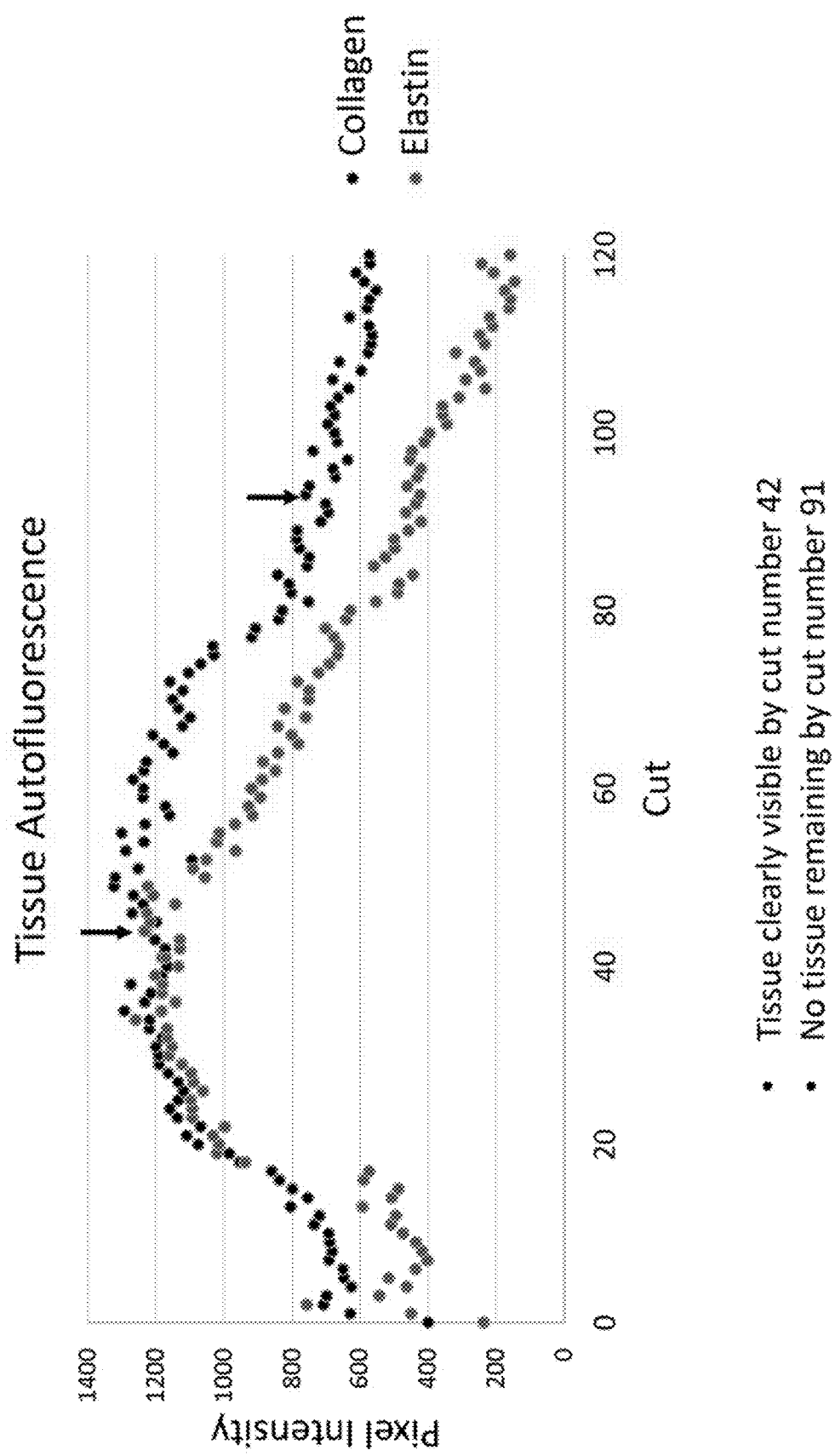
FIG. 6 is a graph displaying the pixel intensity of images of autofluorescence of elastin and collagen in a formalin-fixed paraffin-embedded tissue block after each cut of a section from the tissue block.

The experimental images are shown in FIG. 5. A plot of cut number versus the pixel intensity of each image was plotted, as shown in FIG. 6.

FIG. 5 shows that fluorescent imaging of a tissue in a FFPE block can be used to detect and locate the tissue in the FFPE block. Moreover, as shown in FIG. 6, there was an increase from 200 pixels for an uncut FFPE block to over 1,000 pixels for the faced block when using both GFP and DAPI. Based on the results, it is believed that the observed increase in pixel intensity can be utilized to determine when the tissue is exposed and ready to be cut and used for biological testing.

Example 2

This Example illustrates a method of contrasting tissue using fluorescence emission of paraffin in accordance with an embodiment of the disclosure.

A FFPE human tissue block was obtained. The FFPE block was analyzed to determine if fluorescence of paraffin can be used to differentiate tissue in the FFPE block from paraffin. In particular, the experiment was conducted to determine if an image could be obtained of paraffin fluorescence in the presence of the endogenous fluorophores in tissue. Flourescence intensity of tissue in a FFPE sample was measured using a 365 nm LED excitation source with an emission filter centered at 560 nm (55 nm bandpass). Flourescence intensity of the paraffin surrounding the tissue in an FFPE sample was measured with a 280 nm LED excitation source and an emission filter centered at 405 nm (20 nm wide bandpass).

To collect this data, both the excitation sources front illuminated the block transversely at oblique angles of between 10 and 20 degrees from the plane of the face. No dichroic filter was needed. Emitted light was collected by a lens with a high numerical aperture, looking normal to the face of the block. Illumination from two or more transverse directions (e.g. left and right or top and bottom) produced more uniform excitation and emission patterns.

Figure 8B:
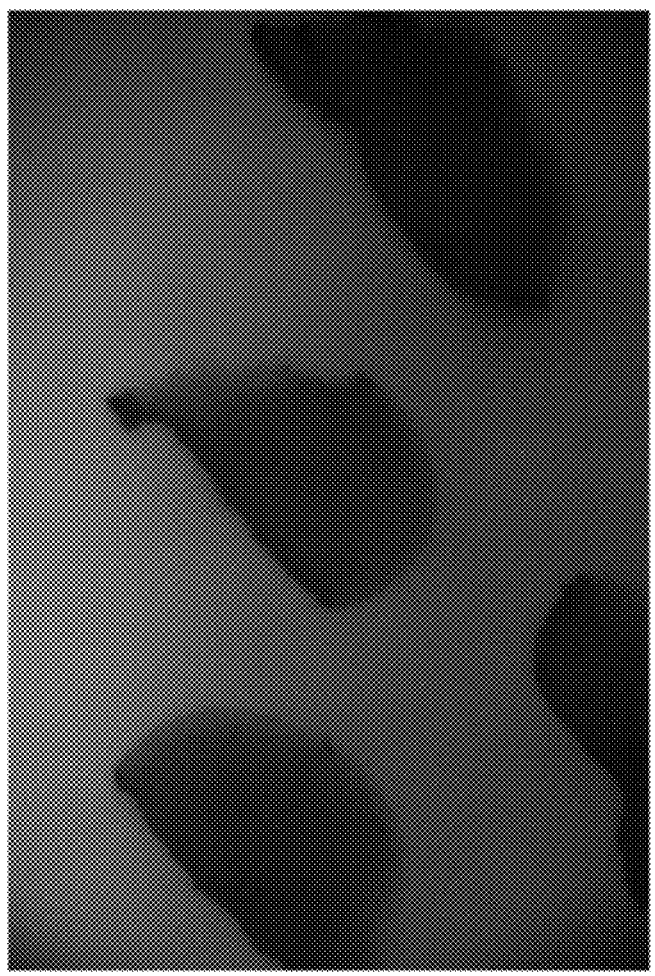
FIG. 8B is a collection of fluorescence emission images of the same FFPE slices, obtained using a 280 nm excitation source and 405 nm 20 nm wide bandpass emission filter.

FIG. 8A shows an image of fluorescence of tissue in the presence of paraffin using a 365 nm excitation source with an emission filter centered at 560 nm (55 nm wide bandpass). FIG. 8B shows paraffin fluorescence using a 280 nm excitation source and an emission filter centered at 405 nm (20 nm wide bandpass). As shown in FIG. 8B, paraffin can undergo fluorescence without appreciable fluorescence of tissue in an embedded sample. The results indicate that contrast between tissue and paraffin may be further enhanced by examining fluorescence in the region of the paraffin.

In view of this disclosure it is noted that the methods and apparatus can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

EXEMPLARY EMBODIMENTS

Exemplary embodiments provided in accordance with the presently disclosed subject matter include, but are not limited to, the claims and the following embodiments:

A1. A method of determining the location of a tissue in an embedded sample, the method comprising:
  irradiating an embedded sample with light, wherein the embedded sample comprises a tissue and an embedding medium;
  detecting fluorescence emission of the embedded sample; and
  determining the location of at least a portion of the tissue in the embedded sample based on the fluorescence emission.

B1. A method of determining the location of a tissue in an embedded sample, the method comprising:
  irradiating an embedded sample comprising a tissue and an embedding medium with at least one light source to produce a first fluorescence emission and a second fluorescence emission;
  detecting the first fluorescence emission and the second fluorescence emission; and
  determining the location of at least a portion of the tissue in the embedded sample based on the first fluorescence emission and the second fluorescence emission.

B2. The method of embodiment B1, wherein the first fluorescence emission is a fluorescence emission of the embedding medium.

B3. The method of embodiment B1 or B2, wherein the second fluorescence emission is a fluorescence emission of a component of the tissue.

B4. The method of any of embodiments B1 to B3, wherein the first fluorescence emission and/or second fluorescence emission has a maximum at a wavelength of from 300 nm to 600 nm, preferably from 300 nm to 550 nm, more preferably from 300 nm to 500 nm, or even more preferably from 300 nm to 450 nm.

B5. The method of any of embodiments B1 to B4, wherein the first fluorescence emission has maximum fluorescence at a wavelength of from a 375 nm to 425 nm and the second fluorescence emission has maximum fluorescence a wavelength of from 500 nm to 600 nm.

AB1. The method of any of the preceding embodiments, wherein the embedding medium is a paraffin.
  AB1.a The method of embodiment AB1, wherein the embedded sample is a formalin-fixed paraffin-embedded (FFPE) tissue block.
  AB1.b The method of embodiment AB1 or AB1.a, wherein the paraffin is granulated paraffin wax, fully refined paraffin wax, semi-refined paraffin wax, or a combination thereof.
  AB1.c The method of embodiment AB1 or AB1.a, wherein the paraffin is a blend of fully refined paraffin wax and a synthetic resin or polymer.
  AB1.d The method of embodiment AB1 or AB1.a, wherein the paraffin is Spectrum paraffin, Millipore paraffin, Fisherfinest Histopath paraffin wax, EMS Paramat, Paraplast & Polyfin, Sakura Finetek Tissue Tek VIP, Leica Surgipath Paraplast, or a combination thereof.
  AB1.e The method of any of embodiments AB1 to AB1.d, wherein the paraffin comprises dimethylsulfoxide (DMSO).

AB2. The method of any of embodiments A1 to B5, wherein the embedding medium is an epoxy resin.
  AB2.a The method of embodiment AB2, wherein the epoxy resin is a glycidyl epoxy.
    AB2.a.i The method of embodiment AB2.a, wherein the glycidyl epoxy resin is glycidyl amine, glycidyl ester, glycidyl ether, or a combination thereof.
    AB2.a.ii The method of embodiment AB2.a., wherein the epoxy resin is Araldite, Quetol, Epon 812, Embed 812, Poly-Bed 812, or a combination thereof.
    AB2.a.iii The method of embodiment AB2.a, the glycidyl epoxy resin is ethylene glycol diglycidyl ether.
  AB2.b The method of embodiment AB2, wherein the epoxy resin is a non-glycidyl epoxy.
    AB2.b.i The method of embodiment AB2.b, wherein the non-glycidyl resin selected from an aliphatic and cyclo aliphatic resin.

AB3. The method of any of the preceding embodiments, wherein the fluorescence emission is detected using an imaging device.
  AB3.a The method of embodiment AB3, wherein the fluorescence emission is detected using an imaging device comprising a camera.
  AB3.b The method of embodiment AB3.a, wherein the camera is a digital camera.
  AB3.c The method of embodiment AB3 to AB3.b, wherein a digital image of the fluorescence emission is used to determine the location of the tissue in the embedded sample.

AB4. The method of any of the preceding embodiments, wherein the method is used to determine the location of a tissue surface.

AB5. The method of any of the preceding embodiments, further comprising slicing a section from the embedded sample after determining the location of the tissue surface.
  AB5.a The method of embodiment AB5, further comprising slicing a section from the embedded sample and accepting or rejecting the section based on the determined location of the tissue surface.

AB6. The method of any of the preceding embodiments, wherein the embedding medium exhibits no substantial fluorescence when irradiated.

AB7. The method of any of the preceding embodiments, wherein the embedded sample is irradiated with light having a wavelength of 200 nm to 600 nm, preferably 250 nm to 550 nm, more preferably 300 nm to 550 nm, or even more preferably 300 nm to 500 nm.

AB8. The method of any of the preceding embodiments, wherein the embedded sample has a maximum fluorescence emission at a wavelength of from 300 nm to 600 nm.

AB9. The method of any of the preceding embodiments, wherein the fluorescence emission is generated by autofluorescence of a component of the tissue.
  AB9.a The method of embodiment AB9, wherein the component is collagen, elastin, tryptophan, a porphyrin, a flavin, NADH, pyridoxin, a lipo-pigment, or a combination thereof.
  AB9.b The method of embodiment AB9, wherein the component has a maximum fluorescence emission at a wavelength of from 300 nm to 550 nm.

AB10. The method of any of the preceding embodiments, wherein the irradiating is performed multiple times and wherein the embedded sample is cut prior to each irradiation.

AB11. The method of any of the preceding embodiments, wherein the tissue is a human tissue.

AB12. The method of any of the preceding embodiments, wherein the tissue is an animal tissue.

AB12.a The method of embodiment AB12, wherein the tissue is a mouse, rat, dog, or primate tissue.

AB13. The method of any of the preceding embodiments, wherein the tissue is from an organ or anatomical part.

AB13.a The method of any of the preceding embodiments, wherein the tissue is isolated from the breast, prostate, lung, colon, rectum, urinary bladder, uterine corpus, thyroid, kidney, oral cavity (e.g., tonsil), pancreas, liver, cervix, stomach, small intestine, brain, spinal cord, heart, bone, joints, esophogus, gallbladder, adipose, skin, spleen, placenta, penis, urethra, fallopian tube, ovary, vulva, adrenal glands, appendix, or eye.

AB14. The method of any of the preceding embodiments, wherein the tissue is pelleted cells from a human or an animal source.

AB15. The method of any of the preceding embodiments, wherein the tissue is diseased or healthy tissue.

AB16. The method of any of the preceding embodiments, wherein the tissue is used to identify cancer, infectious disease, metabolic disease, degenerative disease, inflammatory disease, or a combination thereof.

AB17. The method of any of the preceding embodiments, wherein the present methods are performed to locate an embedded tissue for use in a fluorescence in situ hybridization (FISH) testing method.

AB18. The method of any of the preceding embodiments, wherein the present methods are performed to locate an embedded tissue for use in a chromogenic in situ hybridization (CISH) testing method.

AB19. The method of any of the preceding embodiments, wherein the autofluorescence of one or more endogenous species is measured quantitatively to determine the location of tissue in the embedded sample.

AB20. The method of any of the preceding embodiments, wherein pixel intensity of a digital image is used to determine the location of the tissue in the embedded sample.

AB21. The method of any of the preceding embodiments, wherein the method comprises sectioning or trimming the embedded sample.

AB21.a. The method of any of the preceding embodiments, wherein the method comprises staining a tissue section with at least one stain, wherein the tissue section is obtained by sectioning or trimming the embedded sample.

AB22. The method of any of the preceding embodiments, wherein the embedding medium comprises a fluorescent dye.

AB23. The method of any of the preceding embodiments, wherein the embedded sample is irradiated by two or more light sources.

AB24. The method of any of the preceding embodiments, wherein the embedded sample is irradiated using a light source selected from a light-emitting diode, mercury arc lamp, xenon arc lamp, LASER, and a combination thereof.

AB25. The method of any of the preceding embodiments, wherein the method comprises front illuminating the embedded sample transversely.

AB25.a The method of embodiment AB25, wherein the embedded sample is front-illuminated at an oblique angle of from about 10 degrees to about 20 degrees from a plane of a face of the embedded sample.

C1. An apparatus for slicing a tissue section from an embedded sample, the apparatus comprising:

a microtome comprising a sample holder adapted for linear motion, a knife holder and a knife held by the knife holder opposite the sample holder, such that when the sample holder is moved linearly, a sample held by the sample holder is sliced by the knife to form a tissue section;
at least one light source directed at the sample holder; and
an optical system positioned to capture emitted light from a sample held by the sample holder.

C2. The apparatus of embodiment C1, wherein the optical system comprises a camera.

C2.a The apparatus of embodiment C2, wherein the camera is a digital camera.

C2.b The apparatus of embodiment C2 or C2.a, wherein the camera is a multicolor camera having microfilters in front of each pixel.

C3. The apparatus of embodiment C1, further comprising a processor in communication with the optical system and configured to provide a signal based on a fluorescence emission from the sample.

C4. The apparatus of embodiment C1 to C3, the at least one light source is an LED light source, a mercury arc lamp, a Xenon arc lamp, or a LASER.

C5. The apparatus of embodiment C1 to C4, the optical system comprises at least two light sources, at least three light sources, or at least four light sources.

C6. The apparatus of embodiment C1 to C5, wherein the apparatus comprises a filter cube with a dichroic beam splitter with excitation and emission filters.

C6.a The apparatus of embodiment C6, wherein the apparatus comprises an additional lens after the dichroic filter to focus the emitted light onto an imaging sensor.

C7. The apparatus of embodiment C1 to C6.a, wherein the apparatus comprises an emission filter in a filter cube assembly, where switching of at least one excitation source switches at least one filter.

C8. The apparatus of embodiment C1 to C7, wherein the apparatus includes one or more excitation filters.

C9. The apparatus of embodiment C1 to C8, wherein the apparatus comprises an aperture.

C9.a The apparatus of embodiment C9, wherein the aperture is a high numerical aperture.

C10. The apparatus of embodiment C1 to C9.a, the apparatus comprises one or more emission filters.

C11. The apparatus of embodiment C1 to C10, wherein the apparatus comprises an imaging lens.

C12. The apparatus of embodiment C1 to C4, wherein the apparatus comprises a microtome blade, at least one light source, at least one excitation filter, at least one aperture, at least one emission filter, a lens assembly, and at least one camera.

C13. The apparatus of embodiment C1 to C4, wherein the apparatus comprises a microtome blade, at least two light sources, at least two excitation filters, at least one aperture, at least two emission filters, a lens assembly, at least one camera, and at least one mechanism for switching between emission filters.

C14. The apparatus of embodiment C1 to C4, wherein the apparatus comprises a microtome blade, at least two light sources, at least two excitation filters, at least one aperture, a dual-band bandpass emission filter, a lens assembly, and at least one multi-color camera.

C14.a The apparatus of embodiment C14, wherein the multicolor camera has microfilters in front of each pixel.

C15. The apparatus of embodiment C1 to C4, wherein the apparatus comprises a microtome blade, at least one light source, at least one excitation filter, at least one aperture, an objective lens assembly, a tube lens or relay lens, a dichroic beamsplitter, at least one emission filter in filter cube assembly, and at least one camera.

We claim:

1. A method of determining the location of a tissue in an embedded sample, the method comprising:
   irradiating an embedded sample with light having a wavelength of from about 200 nm to about 600 nm, wherein the embedded sample comprises a tissue and an embedding medium;
   detecting fluorescence emission of the embedded sample; and
   determining the location of at least a portion of the tissue in the embedded sample based on the fluorescence emission.

2. The method of claim 1, wherein the embedding medium is a paraffin.

3. The method of claim 1, wherein the embedded sample is a formalin-fixed paraffin-embedded (FFPE) tissue block.

4. The method of claim 1, wherein the fluorescence emission is detected using an imaging device comprising a camera.

5. The method of claim 4, wherein a digital image of the fluorescence emission is used to determine the location of the tissue in the embedded sample.

6. The method of claim 5, wherein pixel intensity of the digital image is used to determine the location of the tissue in the embedded sample.

7. The method of claim 1, wherein the method is used to determine the location of a tissue surface.

8. The method of claim 7, further comprising slicing or trimming a section from the embedded sample after determining the location of the tissue surface.

9. The method of claim 8, wherein the method comprises staining the tissue section with at least one stain.

10. The method of claim 1, wherein the light has a wavelength of from about 250 nm to about 450 nm.

11. The method of claim 1, wherein the fluorescence emission is generated by autofluorescence of a component of the tissue.

12. The method of claim 11, wherein the component is elastin or collagen.

13. A method of determining the location of a tissue in an embedded sample, the method comprising:
   irradiating an embedded sample comprising a tissue and an embedding medium with at least one light source to produce a first fluorescence emission and a second fluorescence emission;
   detecting the first fluorescence emission and the second fluorescence emission; and
   determining the location of at least a portion of the tissue in the embedded sample based on the first fluorescence emission and the second fluorescence emission.

14. The method of claim 13, wherein the embedded sample is irradiated by at least two light sources.

15. The method of claim 13, wherein the embedded sample is a formalin-fixed paraffin-embedded (FFPE) tissue block and the first fluorescence emission occurs via fluorescence of paraffin.

16. The method of claim 13, wherein the method comprises front illuminating the embedded sample transversely.

17. The method of claim 13, wherein the embedded sample is front-illuminated at an oblique angle of from about 10 degrees to about 20 degrees from a plane of a face of the embedded sample.

18. An apparatus for slicing a tissue section from an embedded sample, the apparatus comprising:
   a microtome comprising a sample holder adapted for linear motion, a knife holder and a knife held by the knife holder opposite the sample holder, such that when the sample holder is moved linearly, a sample held by the sample holder is sliced by the knife to form a tissue section;
   at least one light source directed at the sample holder;
   an optical system positioned to capture emitted light from a sample held by the sample holder; and
   a processor in communication with the optical system and configured to provide a signal based on a fluorescence emission from the sample, wherein a location of the tissue section of the embedded sample is determined based on the fluorescence emission.

19. The apparatus of claim 18, wherein the optical system comprises a camera.

20. The apparatus of claim 18, wherein said light source provides light having a wavelength of from about 200 nm to about 600 nm.

* * * * *